United States Patent [19]
Smith et al.

[11] Patent Number: 5,779,903
[45] Date of Patent: Jul. 14, 1998

[54] FILTER ASSEMBLIES AND END CAPS FOR FILTER ASSEMBLIES

[75] Inventors: Karl S. Smith, Portsmouth; Roger A. Buttery, Petersfield; Richard G. Gutman, Chichester, all of United Kingdom

[73] Assignee: Pall Corporation, East Hills, N.Y.

[21] Appl. No.: 743,252

[22] Filed: Nov. 4, 1996

[30] Foreign Application Priority Data

Nov. 2, 1995 [GB] United Kingdom ............ 9522454

[51] Int. Cl.$^6$ ................................................. B01D 27/08
[52] U.S. Cl. ............................ 210/440; 210/443; 210/444; 210/450; 210/455; 210/493.2; 55/502; D23/209
[58] Field of Search .................................. 210/440, 443, 210/444, 450, 455, 493.2; 55/502; D23/209

[56] References Cited

U.S. PATENT DOCUMENTS

| | | |
|---|---|---|
| D. 294,167 | 2/1988 | Meissner ............... D23/209 |
| D. 320,062 | 9/1991 | Meissner ............... D23/209 |
| D. 321,745 | 11/1991 | Murrell ................. D23/209 |
| D. 322,836 | 12/1991 | Petrucci et al. ......... D23/209 |
| 2,709,524 | 5/1955 | Russell et al. . |
| 4,126,559 | 11/1978 | Cooper ................. 210/445 |
| 4,265,752 | 5/1981 | O'Banion .............. 210/452 |
| 4,629,557 | 12/1986 | Tobias . |
| 4,834,885 | 5/1989 | Misgen et al. .......... 210/440 |
| 4,969,994 | 11/1990 | Misgen et al. .......... 210/232 |
| 5,035,798 | 7/1991 | Stenger ................ 210/232 |

*Primary Examiner*—W. L. Walker
*Attorney, Agent, or Firm*—Leydig, Voit & Mayer, Ltd.

[57] ABSTRACT

A filter assembly has a housing accommodating a filter element. One end cap of the filter element has a generally annular body with support fins projecting from one surface. A peripheral flange extends from the edge of the body and is spaced from the outer ends of the fins to allow differential expansion of the flange without undue stress. The flange carries two opposed sets of pegs for supporting respective sealing rings to allow the flange to seal between parts of the housing.

42 Claims, 4 Drawing Sheets

FILTER ASSEMBLIES AND END CAPS FOR FILTER ASSEMBLIES

BACKGROUND OF THE INVENTION

1. Field of the Invention

The invention relates to filter assemblies and end caps for filter assemblies.

2. Description of the Related Art

A known form of filter assembly comprises a housing containing a filter element. The housing has an inlet and an outlet with the inlet feeding fluid to be filtered to the filter element and the outlet flowing filtered fluid from the housing.

A commonly used filter element is in the form of a pleated sheet of filter material formed into a hollow cylinder with the fluid being filtered by passage through the filter material. For mounting the filter element in the housing, the filter element is provided with end caps. One end cap is mounted at one end of the filter element and the other end cap is mounted at the other end of the filter element. One end cap seals one end of the filter material and also prevents access to the interior of the filter element. The other end cap closes the other end of the filter material but is provided with a central aperture providing fluid communication with the interior of the filter element.

It is known from U.S. Pat. No. 4,126,559 to provide the apertured end cap with angularly spaced flow directing fins lying in respective planes including the axis of the aperture with a generally radially extending annular flange projecting from the radially outer ends of the fins and being clamped between two housing parts together with a seal. The purpose of this is to ensure that any unfiltered fluid that leaks round the end cap drains to the exterior of the housing and does not contaminate the filtered fluid.

SUMMARY OF THE INVENTION

According to a first aspect of the invention, there is provided an end cap comprising an annular body having inner and outer radially extending faces extending between a central aperture and an outer peripheral edge, a support portion surrounding the central aperture and comprising, in a preferred embodiment, a plurality of angularly spaced fins on the outer face, each fin including a radially outer edge terminating radially inwardly of the outer peripheral edge of the body, and an annular flange extending from the outer peripheral edge and being spaced from the radially outer edges of the fins. In a preferred embodiment, each flange has a portion extending from the body in a direction generally parallel to the aperture axis followed by a portion extending generally radially relative to the aperture axis for carrying a seal for sealing engagement with a housing.

By separating the flange from the fins, the flange can accommodate differential expansion with reduced stress.

According to a second aspect of the invention, there is provided an end cap comprising an annular body having inner and outer radially extending faces extending between a central aperture and an outer peripheral edge, a support portion, which may comprise a plurality of angularly spaced fins on the outer face, and an annular flange extending from the outer peripheral edge and including a portion extending generally radially relative to the aperture axis, the portion having an inner surface and an outer surface, each surface carrying mounting means for a seal.

According to a third aspect of the invention, there is provided a filter assembly comprising a housing containing a filter element, an end of the filter element carrying an end cap according to the first or the second aspects of the invention with the generally radially extending portion of the flange being clamped between two housing parts.

BRIEF DESCRIPTION OF THE DRAWINGS

The following is a more detailed description of an embodiment of the invention, by way of example, reference being made to the accompanying drawings in which.

DESCRIPTION OF PREFERRED EMBODIMENTS

Figure 1:
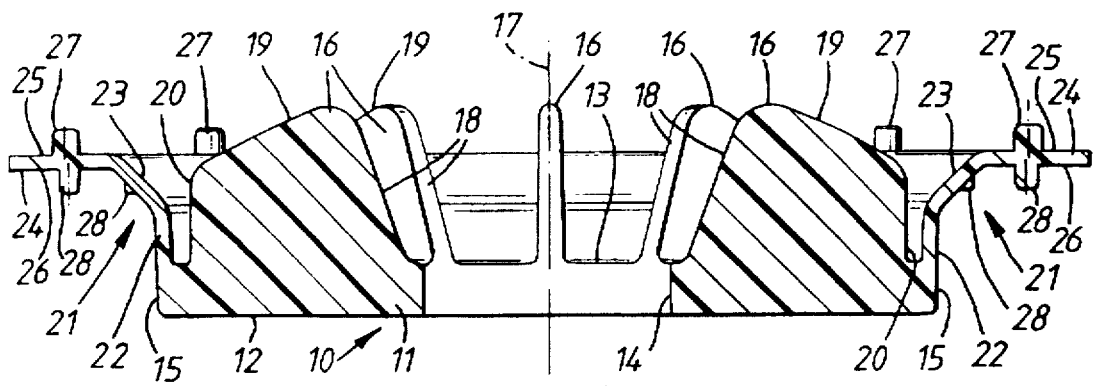
FIG. 1 is a cross section through an end cap for mounting in a housing of a filter assembly.
Figure 2:
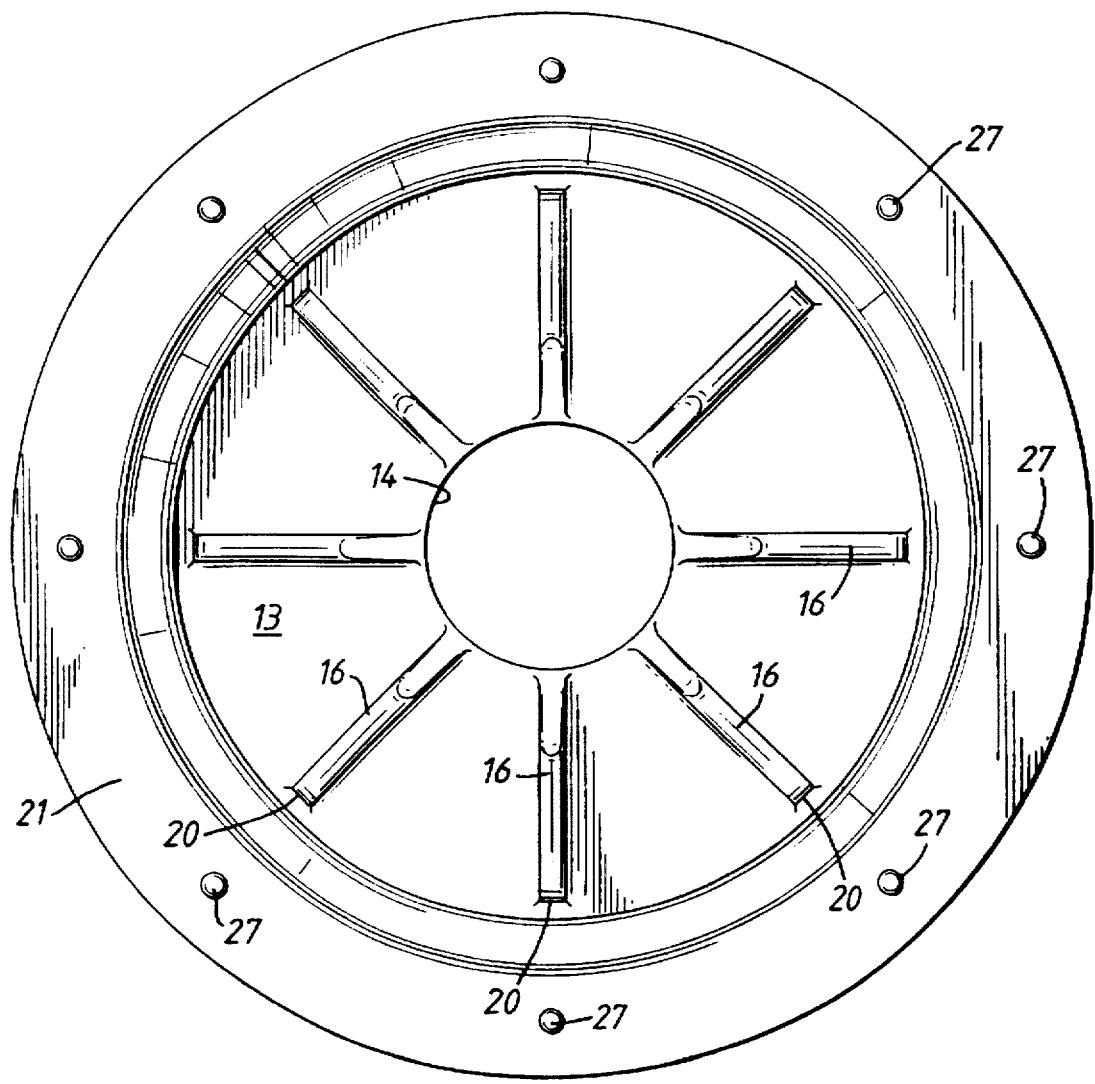
FIG. 2 is a plan view of one side of the end cap of FIG. 1.
Figure 3:
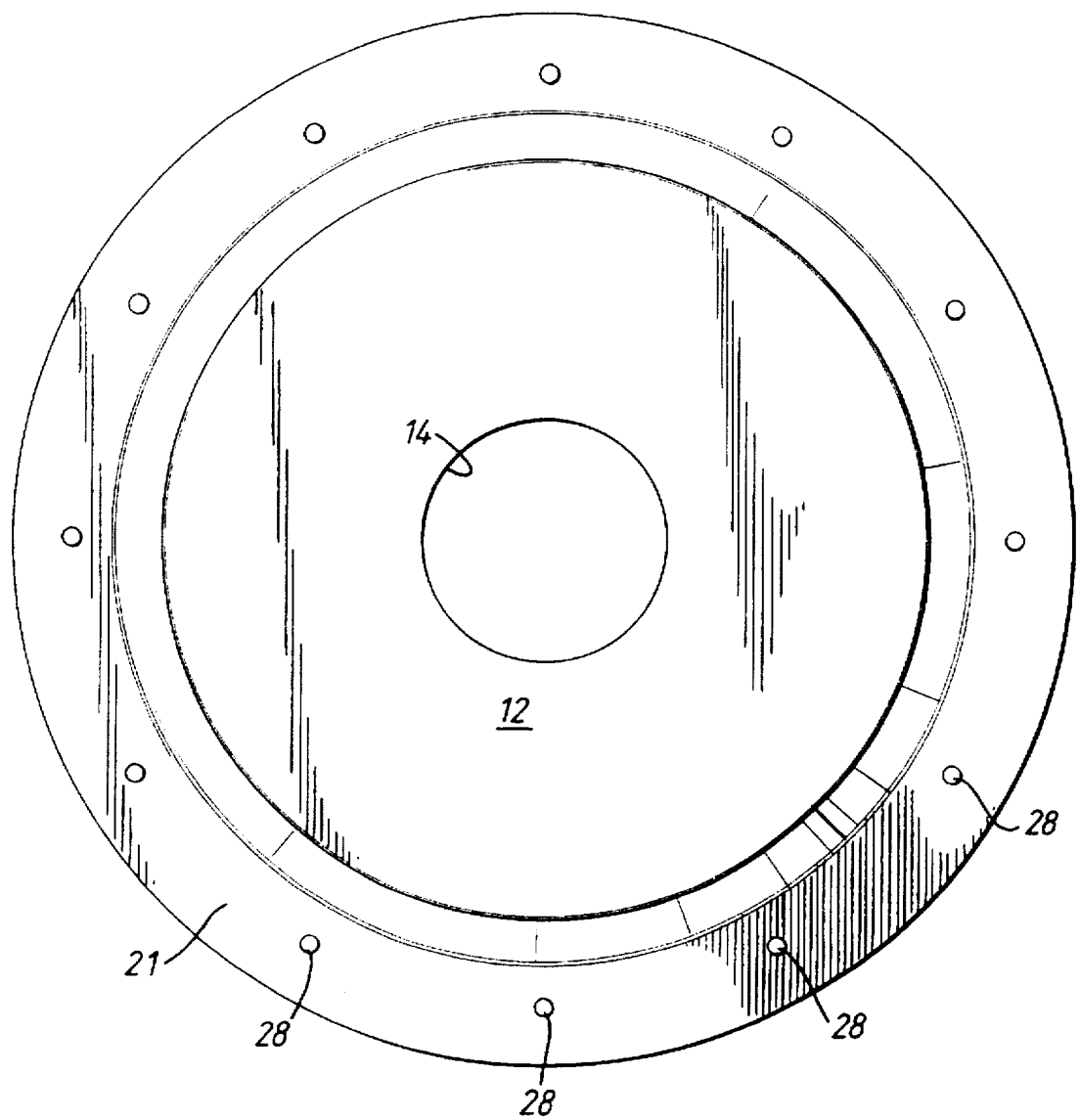
FIG. 3 is a plan view of the other side of the end cap of FIG. 1.

Referring first to FIGS. 1 to 3, the end cap indicated generally at 10 is formed from any suitable material. For example, it may be molded from a plastics material such as polypropylene.

The end cap 10 comprises a generally annular body 11 having an inner surface 12, an outer surface 13, a central circular aperture 14, and an outer peripheral edge 15. A plurality of fins 16, such as eight, project from the outer surface 13 of the body 11 with each fin 16 lying in a respective plane normal to the outer surface 13 and including the axis 17 of the aperture 14, although the fins 16 may have a different orientation with respect to the outer surface 13 and the axis 17. Thus, the fins 16 need not be normal to the outer surface 13 of the body 11 and need not be aligned with the axis 17 of the aperture 14. Each fin 16 has an angled inner edge 18 followed by a backwardly sloping upper edge 19 and an outer edge 20 extending generally normal to the outer surface 13. The outer edge 20 terminates radially inwardly of the outer peripheral edge 15 of the body 11.

An annular flange 21 extends from the outer peripheral edge 15 of the body 11. The flange 21 has an initial portion 22 extending in a direction upwardly and away from, such as generally normal to, the outer surface 13 and generally in the direction of, such as parallel to the aperture axis 17 and the outer edges 20 of the fins 16. The flange 21 then has an outwardly flared portion 23 followed by a radially extending portion 24. The radially extending portion 24 has an outer surface 25 and an inner surface 26.

The outer surface 25 is provided with a plurality, such as eight equiangularly spaced pegs 27 best seen in FIG. 2. Each peg 27 is in angular register with one of the fins 16. The inner surface 26 is provided with a plurality, such as twelve equiangularly spaced pegs 28 with every fourth peg being in angular register with a fin 16. The number of pegs 27, 28 may be different from in the drawings, and the pegs need not be equiangularly spaced or in register with any of the fins 16.

The radial distance from the aperture axis 17 may be different for pegs 27 and 28. For example, in this embodiment, pegs 28 on the inner surface 26 are positioned radially inwardly of the pegs 27 on the outer surface. In addition, the pegs 28 on the inner surface 26 have a different, e.g., smaller diameter than the pegs 27 on the outer surface 25.

Figure 5:
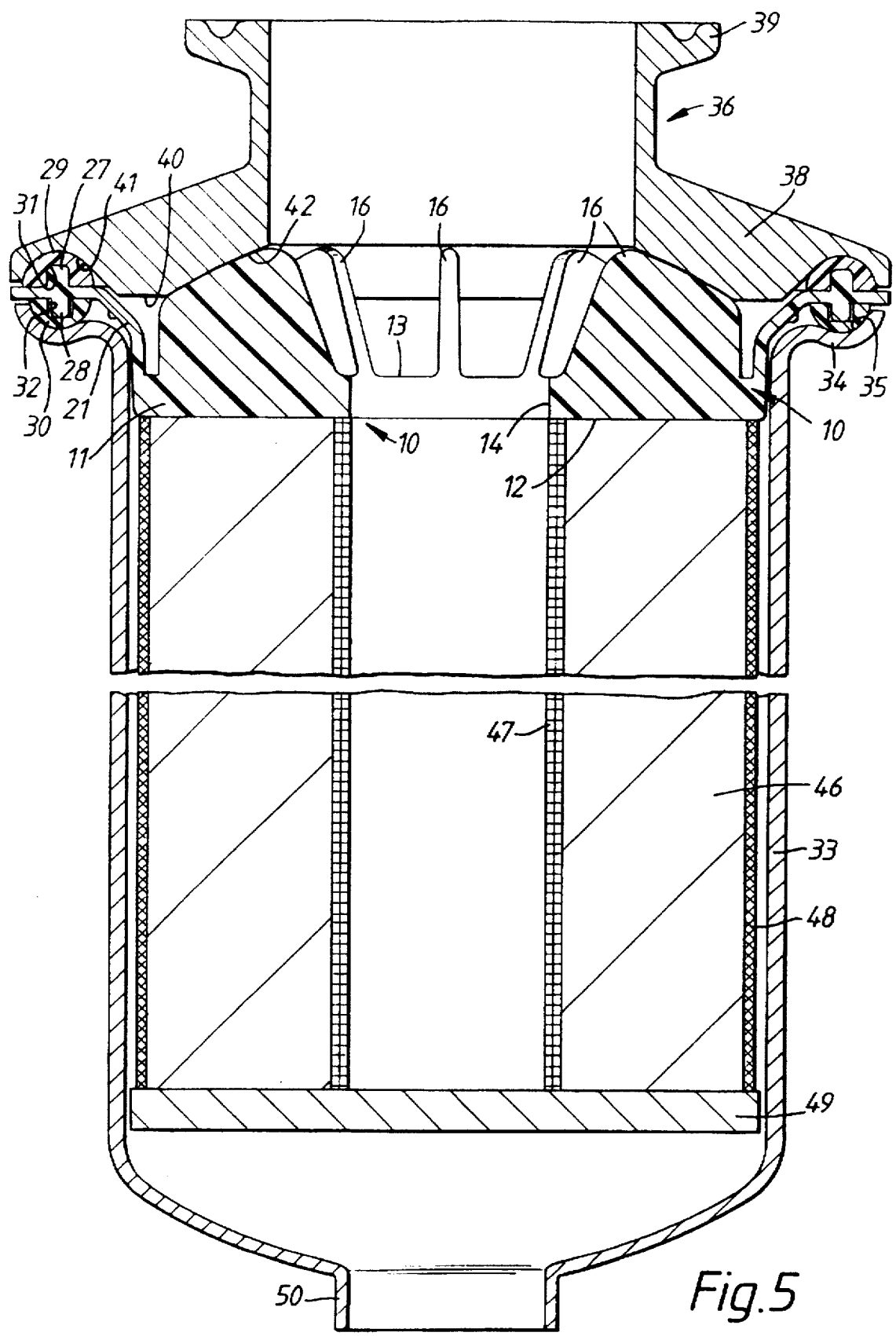
FIG. 5 is a partial cross-section through a part of a filter assembly showing an end cap according to FIGS. 1 to 3 mounted between two housing parts.

As seen in FIG. 5, each surface of the radially extending portion carries a respective sealing ring 29,30. As also seen in FIG. 5, the outer sealing ring 29 is of generally semi-circular cross-section. The inner sealing ring 30 is generally semi-circular and may have short extended parallel side portions.

The sealing ring 29 on the outer surface 25 is provided with angularly spaced blind locating holes 31 that have a slight interference fit with the associated pegs 27 to hold the sealing ring 29 firmly on the outer surface 25.

Figure 4:
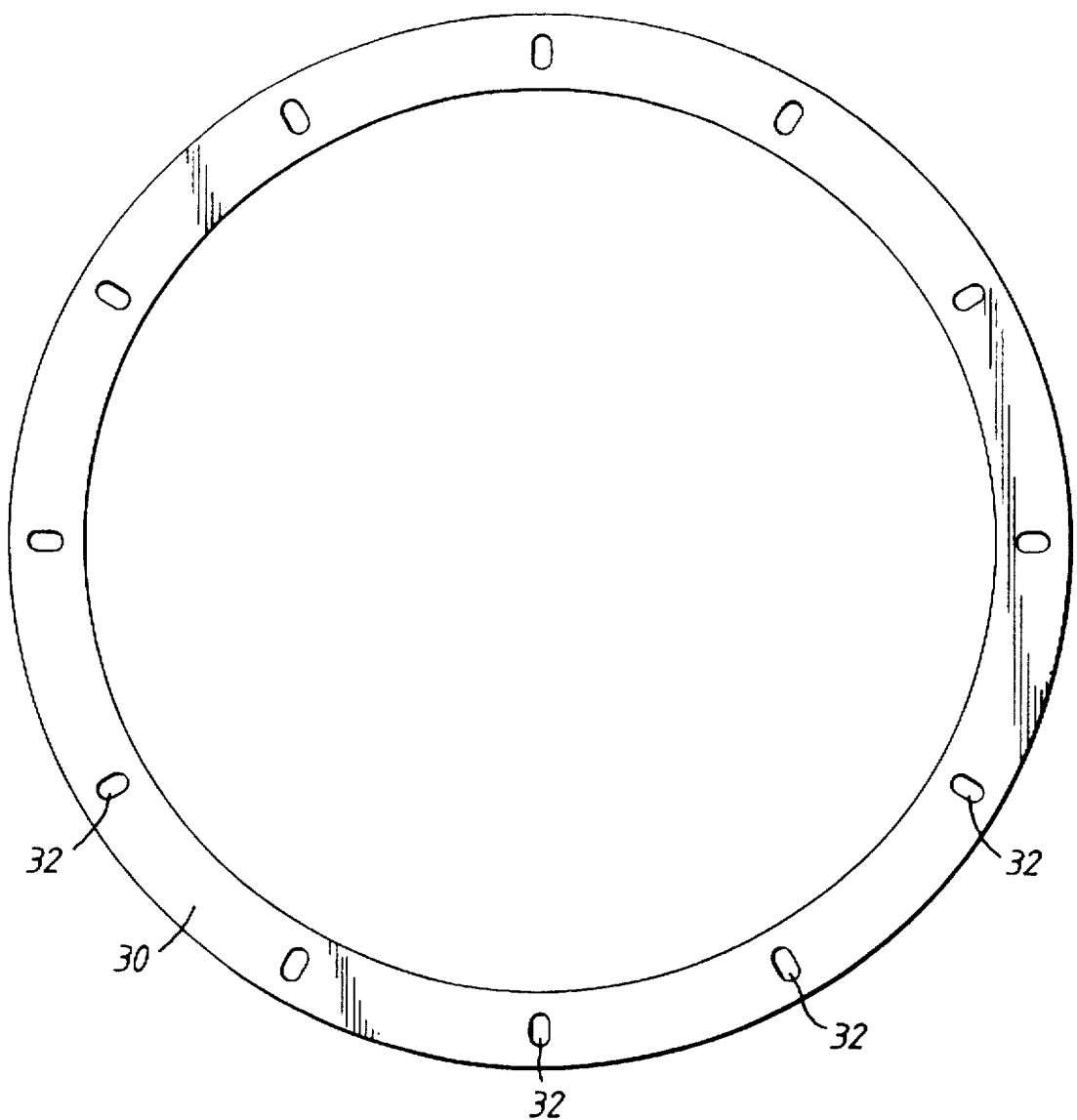
FIG. 4 is a plan view from beneath of an inner sealing ring for mounting on the end cap of FIGS. 1 to 3 showing radially elongated blind holes.

In contrast, the inner sealing ring 30 is provided with radially elongated blind holes 32 that engage the pegs 28 on the inner surface 26. These are best seen in FIG. 4. The purpose of the radially elongated blind holes 32 will be described below.

The different diameters and numbers of the pegs 27, 28 ensure that the sealing rings 29,30 cannot be fitted incorrectly.

In use, the end cap 10 is fitted to an end of a suitable filter element. One form of suitable filter element 45, not seen in FIG. 5, comprises a corrugated filter material 46 formed into a generally annular shape around a central core 47 and with a cage 48 around the exterior surface. One end of the generally cylindrical shape so formed is closed by a flat plate end cap 49 and the other end is attached to the end cap 10. The attachment is by connection between the inner surface 12 and the pleated filter material 46. The connection may be by gluing or welding or any other suitable process.

The filter element 45 so formed is then mounted in a housing shown in FIG. 5. With reference to that figure, the housing comprises a housing body 33 which is generally cylindrical and which is provided at one end with an inlet 50. The other end of the housing body is provided with a generally radially outwardly extending flange 34 formed with an annular concave recess 35.

The housing also includes an outlet member 36 which is generally cylindrical in shape with a passage 37 passing through the member 36. One end of the outlet member 36 is provided with an upstream mounting flange 38 and the other end of the outlet member 36 is provided with a downstream mounting flange 39. The upstream mounting flange 38 has a flange surface 40 provided towards its outer edge with an annular concave groove 41. The portion of the flange surface 40 leading to the passage 37 is provided with a frustoconical bevel 42.

The end cap 10 and the remainder of the associated filter element are lowered into the first housing part 33 until the inner surface seal 29 rests in the recess 35 in the flange 34 on the first housing part 33. The presence of the radially elongated blind holes 32 ensures that the sealing ring 29 can move radially to locate housing parts 33 of differing diameters.

The outlet member 36 is then placed over the open end of the first housing part 33 so that the groove 41 receives the outer surface sealing ring 29. The upper edges 19 of the fins 16 engage the bevel 42 on the flange surface 40.

The upstream mounting flange 38 and the first housing part flange 34 are then clamped together to compress the sealing rings 29,30.

Fluid to be filtered is supplied to the housing through the inlet. The fluid passes to the exterior of the filter element 45 and is filtered through the filter element 45. The filtered fluid then leaves the interior of the filter element 45 through the aperture 14 in the end cap 10 and through the passage 37 in the outlet member.

If there is any leakage of unfiltered fluid past the inner surface seal 30, such leakage will drain to the exterior of the housing. This prevents contamination of the filtered fluid by such leakage.

The fins 16 function as a support portion and give uniform support to the body 11. This is particularly important while the filter assembly is being steamed up to 140° C. since it minimizes deflection of the body 11 by the engagement of the upper edges 19 of the fins 16 on the bevel 42 on the flange surface 40.

In addition, the fins 16 are not connected to the flange 21. This allows differential expansion of the flange faces 25,26 relative to the housing while avoiding stressing the flange 21.

The two sealing rings 29,30 provide upstream and downstream sealing without allowing unfiltered fluid to contaminate filtered fluid or vice versa.

The presence of the pegs 27,28 at differing diameters prevents the sealing rings 29,30 being incorrectly assembled. In addition, the radially elongated blind holes 32 allow variations in the diameter of the center line of the recess 35 to be accommodated.

What is claimed is:

1. An end cap comprising an annular body having inner and outer radially extending faces extending between a central aperture and an outer peripheral edge, a plurality of angularly spaced fins on the outer face, each fin including a radially outer edge terminating radially inwardly of the outer peripheral edge of the body, an annular flange extending from the outer peripheral edge and being radially spaced from the radially outer edges of the fins, the flange having a portion extending from the body in a direction generally parallel to the aperture axis followed by a portion extending generally radially relative to the aperture axis for carrying a seal for sealing engagement with a housing.

2. An end cap according to claim 1, wherein the portion of the flange extending generally radially has an inner surface and an outer surface, each surface carrying mounting means for a seal.

3. An end cap according to claim 2, wherein at least one of the mounting means comprises a plurality of pegs extending from the associated surface and angularly spaced around the associated surface.

4. An end cap according to claim 3, wherein the pegs are equiangularly spaced around the associated surface.

5. An end cap according to claim 3, wherein each peg is generally circular in cross-section.

6. An end cap according to claim 3, wherein each surface is provided with a respective plurality of pegs, each peg of each plurality having the same radius from the axis of the aperture as the remaining pegs of the plurality.

7. An end cap according to claim 6, wherein the pegs are equiangularly spaced around the associated surface.

8. An end cap according to claim 6, wherein the radius of one plurality of pegs from the aperture axis is different from the radius of the other plurality of pegs from the aperture axis.

9. An end cap according to claim 6, wherein each peg is generally circular in cross-section.

10. An end cap according to claim 9, wherein the diameters of the pegs of one plurality of pegs are the same and the diameters of the pegs of the other plurality of pegs are the same.

11. An end cap according to claim 10, wherein the peg diameter of one plurality is different from the peg diameter of the other plurality.

12. An end cap according to claim 2 in combination with two seals, one seal being carried by the mounting means on one surface and the other seal being carried by the mounting means on the other surface.

13. An end cap according to claim 12, wherein each surface is provided with a respective plurality of pegs, each peg of each plurality having the same radius from the axis of the aperture as the remaining pegs of the plurality, and each seal is generally annular and includes an angularly spaced plurality of holes which receive the pegs of the associated surface.

14. An end cap according to claim 13, wherein the pegs are an interference fit in the associated holes.

15. An end cap according to claim 13, wherein the holes are radially elongated to accommodate variations in the radii of the associated pegs.

16. An end cap according to claim 6, wherein one surface carries more pegs than the other surface.

17. An end cap according to claim 13, wherein one surface carries more pegs than the other surface.

18. A filter assembly comprising a housing containing a filter element, an end of the filter element carrying an end cap according to claim 1 with the radially extending portion of the flange being clamped between two housing parts.

19. A filter assembly according to claim 18, wherein the portion of the flange extending generally radially has an inner surface and an outer surface, each surface carrying mounting means for a seal, and wherein a first seal is carried by the mounting means on one surface and a second seal is carried by the mounting means on the other surface wherein the housing parts bear against respective seals to clamp the seals between the housing parts and the radially extending portion of the flange.

20. An end cap comprising an annular body having inner and outer radially extending faces extending between a central aperture and an outer peripheral edge, a plurality of angularly spaced fins on the said outer face, each fin lying in a respective plane including the axis of the aperture, an annular flange extending from the outer peripheral edge and including a portion extending generally radially relative to the aperture axis, the portion having an inner surface and an outer surface, each surface carrying mounting means for a seal.

21. An end cap according to claim 20, wherein each fin includes a radially outer edge terminating radially inwardly of the outer peripheral edge of the body, the annular flange having a portion extending from the body in a direction generally parallel to the aperture axis, the radial portion extending from the portion.

22. An end cap according to claim 20, wherein at least one of the mounting means comprises a plurality of pegs extending from the associated surface and angularly spaced around the associated surface.

23. An end cap according to claim 22, wherein the pegs are equiangularly spaced around the associated surface.

24. An end cap according to claim 22, wherein each peg is generally circular in cross-section.

25. An end cap according to claim 22, wherein each surface is provided with a respective plurality of pegs, each peg of each plurality having the same radius from the axis of the aperture as the remaining pegs of the plurality.

26. An end cap according to claim 25, wherein the pegs are equiangularly spaced around the associated surface.

27. An end cap according to claim 25, wherein the radius of one plurality of pegs from the aperture axis is different from the radius of the other plurality of pegs from the aperture axis.

28. An end cap comprising:
an annular body having first and second opposite faces extending radially from a central aperture, an annular flange extending from the annular body and having first and second opposite surfaces, the first surface of the flange adapted to engage a first sealing member and the second surface of the flange adapted to engage a second sealing member, a first set of pegs for engagement with the first sealing member and extending from the first surface of the flange, and a second set of pegs for engagement with the second sealing member and extending from the second surface of the flange, the first set of pegs and the second set of pegs being arranged to prevent engagement of the first sealing member with the second surface of the flange and the second sealing member with the first surface of the flange.

29. A filter assembly comprising:
a filter element; and
an end cap comprising an annular body having a central aperture and first and second opposite surfaces, the first surface being adjacent to the filter element, a support portion extending from the second surface of the annular body around the central aperture for supporting a portion of a housing, and an annular flange extending from the annular body around and spaced from the support portion, the flange having a first portion extending away from the second surface of the annular body and defining a wall surrounding and spaced from the support portion, and a second portion extending generally radially from the first portion for carrying a seal for sealing engagement with a housing.

30. The end cap of claim 28, wherein the first set of pegs includes a first number of pegs and the second set of pegs includes a second number of pegs, the first number being different from the second number.

31. The end cap of claim 28, wherein the first set of pegs is radially offset with respect to the second set of pegs.

32. The end cap of claim 28, wherein the first set of pegs is angularly offset with respect to the second set of pegs.

33. The end cap of claim 28, wherein the pegs of the first set each have a first shape and the pegs of the second set each have a second shape, the first shape being different from the second shape.

34. The end cap of claim 33, wherein the pegs of the first set each have a first diameter, and the pegs of the second set each have a second diameter, the first diameter being different from the second diameter.

35. The end cap of claim 30, wherein the pegs of the first set are equiangularly spaced from each other and the pegs of the second set are equiangularly spaced from each other.

36. The filter assembly of claim 29, wherein the second portion of the flange includes first and second opposite surfaces, the first surface for carrying a first seal, the second surface for carrying a second seal.

37. The filter assembly of claim 36, wherein the first surface of the second portion of the flange includes a first set of pegs adapted to engage the first seal, and the second surface of the second portion of the flange includes a second set of pegs adapted to engage the second seal.

38. The filter assembly of claim 37, wherein the first and second sets of pegs are arranged to prevent engagement of the first seal with the second surface of the second portion of the flange and the second seal with the first surface of the second portion of the flange.

39. The filter assembly of claim 29, wherein the second portion of the flange includes first and second opposite surfaces, the first and second opposite surfaces being substantially flat.

40. The filter assembly of claim 29, wherein the first portion of the flange includes a wall portion substantially parallel to an axis of the aperture and an annular flare extending radially and angularly outward from the wall portion.

41. The filter assembly of claim 40, wherein the wall portion is radially spaced from the support portion.

42. The filter assembly of claim 29, wherein the support portion comprises a plurality of fins.

* * * * *